March 11, 1941.  J. G. RAY  2,234,503
AERODYNAMIC RETARDER
Filed Jan. 14, 1938  2 Sheets-Sheet 1

WITNESS
F. J. Hartman.

INVENTOR
James G. Ray,
BY John D. Myers
ATTORNEY

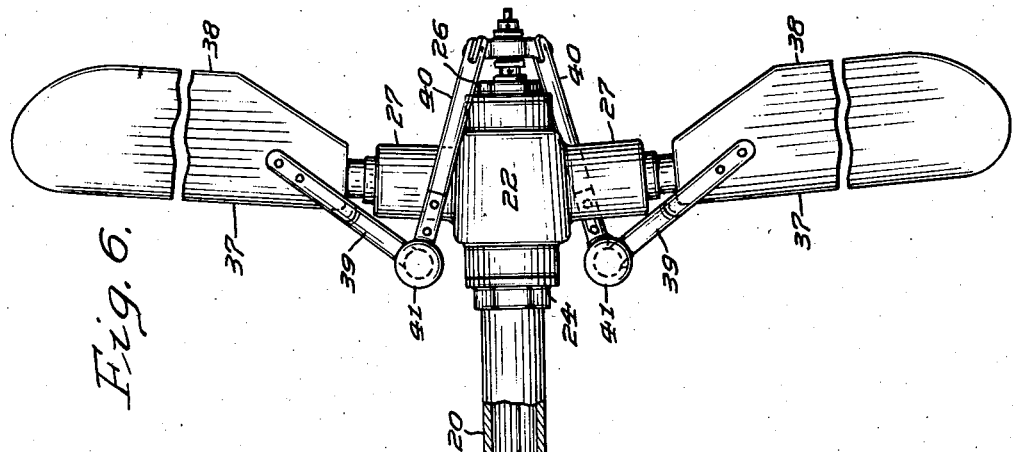
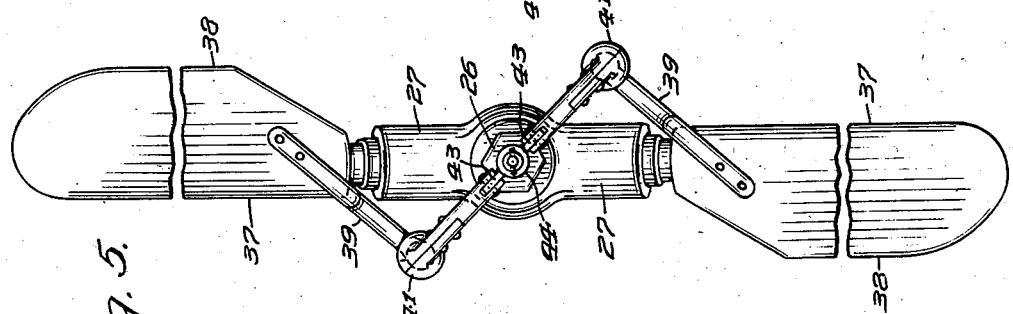
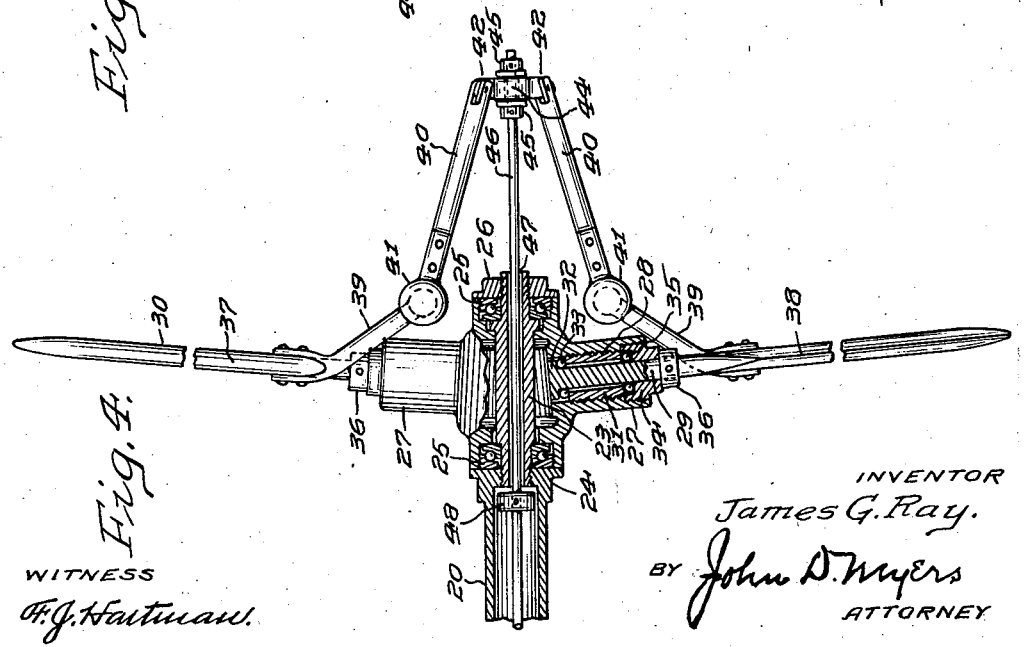

Patented Mar. 11, 1941

2,234,503

UNITED STATES PATENT OFFICE 2,234,503

AERODYNAMIC RETARDER

James G. Ray, Hatboro, Pa.

Application January 14, 1938, Serial No. 184,952

3 Claims. (Cl. 244—113)

The invention relates to aerodynamic retarders, and involves improved means for decelerating the movement of a body through the air. While the invention is especially useful in connection with aircraft, it may also be employed in effecting a braking action upon the rapid movement of any body through the air, such for example as an automobile, a train, a projectile, or any other similar device.

The invention is based primarily upon the principle of autorotation. This phenomenon is now well known in connection with certain types of aircraft wherein the principle is employed for the purpose of providing sustentation or lift for the craft in a vertical direction. I have discovered that the forces developed by an autorotative rotor actuated by airflow may be so employed as to provide a powerful dragging or braking action upon the forward movement of an aircraft or other body through the air. I have also found that these forces may be availed of by so constructing the air-driven rotor and so attaching it to the moving body that the rotor, or parts thereof, may be actuated manually at any time desired in order to move it into and out of autorotative position to thereby utilize the airflow due to the forward movement of the body to effect the braking action.

It is one of the principal objects of my invention, therefore, to provide an effective braking action upon a body which is in rapid movement through the air. A further object of the invention is the provision for such a body of a braking device which is dependent upon relative airflow to provide a retardation of the forward movement of the body through the air. Another object of the invention is the utilization of the braking action of an air-driven, autorotative rotor for retarding the forward movement of such a body. It is also an object of the invention to provide an autorotative braking device which may be moved into and out of autorotative position at will in order that the retarding action may be secured at any time and to the extent desired. The invention also has for one of its objects the provision of an aerodynamic retarding device which may be moved easily into and out of operative position irrespective of the speed of the object to which it is attached. A still further object is the provision of an aerodynamic retarder which offers little resistance to the flow of air and therefore effects but little braking action when it is in its inoperative position. Still further objects and advantages of the invention will be apparent from the following description, taken with the accompany drawings wherein:

Fig. 4 is a side elevational view, partly in section, showing the detailed construction of my retarding device in autorotating or operative position;

Fig. 5 is a rear elevational view of the device as shown in Fig. 4; and

Fig. 6 is a side elevational view of the device in inoperative position.

Figure 1:
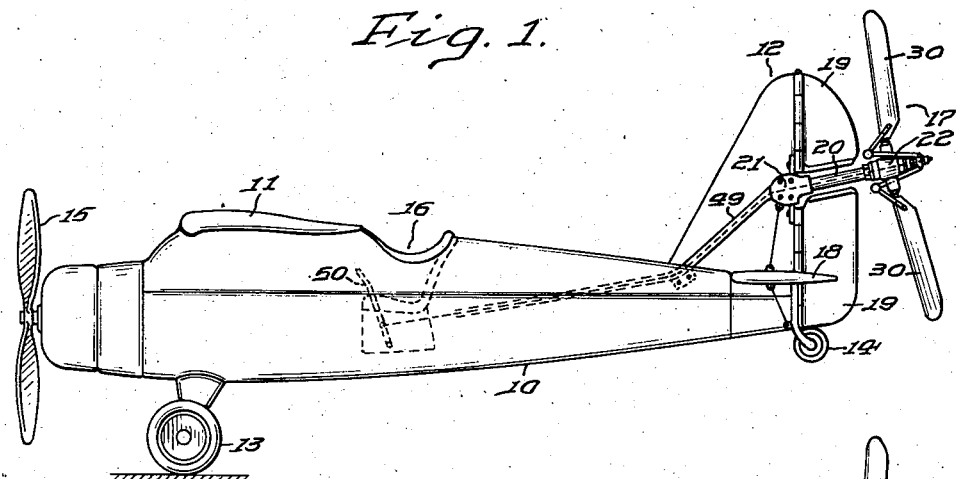
Fig. 1 is a side elevational view of an airplane having my invention incorporated therein.

As I have illustrated the same in Fig. 1 of the drawings, my improvement is incorporated in an airplane of usual construction and having a fuselage 10, wings 11, a tail structure 12, main ground wheels 13, a tail wheel 14, an air screw 15, and a pilot's cockpit 16. Except for the incorporation of my improved retarding device 17 therein, the tail structure of the craft may be of any known type such as one comprising an elevator 18, a rudder 19, and suitable control means therefor operated from the cockpit 16.

The rotor element of the retarding device 17 is supported upon a tubular member 20 having its inner end rigidly secured in the tail structure 12 as shown at 21 in Fig. 1. In a single rudder type of craft, the supporting member 20 may conveniently be arranged between upper and lower sections of the rudder as illustrated in Fig. 1, and it is preferably so positioned that its longitudinal axis is directed toward the center of gravity of the craft in order that the stability of the craft may be affected as little as possible when the retarding device is in its operative position and producing a dragging action upon the forward movement of the craft.

The outer end of the tubular member 20 is constructed to form a support for the autorotative device. As disclosed herein, this device is carried by a hub 22 mounted for rotary movement upon a hollow spindle 23 the forward end of which is threaded into a head 24 on the outer end of the tubular member 20. Suitable bearing members 25 are incorporated in the hub structure to take care of both longitudinal and radial thrust of the rotor device. The hub 22, the spindle 23, and the bearing members 25 may be retained in assembled position by means of a cap 26 threaded on the outer end of the spindle.

The hub 22 is provided with one or more hollow bosses 27, extending radially therefrom. In order to compensate for the dragging force and the centrifugal force of the device when it is in operation, these bosses are preferably inclined slightly backward from a true radial direction, the inclination being such as to afford an approximate equilibrium between the two forces. As disclosed in the drawings, the rotor device is provided with two bosses 27 arranged diametrically on the hub 22. It will be understood, however, that a single boss or any desired number may be employed as long as the entire rotor is suitably counterbalanced when in operation.

Each of the bosses 27 is provided with a longitudinal opening 28 within which the shaft 29 of a blade 30 is mounted for rotational adjustment of the blade about a longitudinal axis thereof. As shown in Fig. 4 of the drawings, the shaft 29 extends through a sleeve 31 threaded within the boss 27 and is provided with a head 32 on its inner end which co-operates with suitable bearing members 33 acting against the inner end of sleeve 31 to resist outward thrust of the blade when the rotor is in operation. A cap 34 surrounding the shaft 29 and threaded into the outer end of the boss 27 co-operates with suitable bearing members 35 which support the shaft in the outer end of the boss. A collar 36 may be secured on the shaft 29 to limit its inward movement with respect to the boss 27.

The blades 30 may be of any suitable structure structure comprising an airfoil section. In Figs. 1 and 6 of the drawings the blades 30 are shown in an inoperative position. In this setting of the blades each is so arranged as to be within a plane which includes the axis about which the hub 22 rotates, the advancing edges 37 of the blades being directed forwardly with respect to the craft and the trailing edges 38 being directed rearwardly with respect thereto.

In order to rotate each of the blades 30 about a longitudinal axis for the purpose of adjustment from the inoperative position shown in Figs. 1 and 6 into the operative or autorotative position shown in Figs. 4 and 5, the inner end of each blade is provided with an arm 39 which extends angularly from the advancing edge 37 in such a direction that movement of the outer end of the arm around the boss 27 may operate to rotate the blade in the manner and to the extent desired. The outer end of each arm 39 is connected to the adjacent end of a link 40 by means of a universal joint 41, the opposite end of each link being hinged at 42 to projecting lugs 43 on a collar 44 rotatably mounted upon a bearing member 45. The collar 44 is movable longitudinally with the bearing member 45, and the latter is secured on the outer end of a control rod 46 which extends through an opening 47 in the spindle 23, thence through the tubular support 20. A collar 48 may be secured on the control rod 46 in such a position as to abut against the head 24 and thus limit movement of the control rod outwardly through the hub and consequently limit movement of the blades to produce maximum autorotative drag. The control rod 46 extends forwardly from the tubular support 20 through a suitable guide tube 49 and may have its forward end connected to a control lever 50 in the cockpit.

With the mechanism just described, it will be apparent that movement of the free end of the control lever 50 rearwardly will operate to move the outer end of the control rod 46 and the rotatable collar 48 carried thereon from the position shown in Figs. 1 and 6 into the position shown in Fig. 4, the blades 30 of the rotor being thereby moved from the inoperative position shown in Figs. 1 and 6 into the autorotative position shown in Figs. 4 and 5. Inasmuch as the blades are designed with an airfoil section, the relative airflow due to the forward movement of the craft will not rotate the retarding device when the blades are in the position shown in Figs. 1 and 6. As soon as the blades are moved slightly out of the position shown in Fig. 6 toward the position shown in Figs. 4 and 5, there is set up a rotational movement which is known in the art as wind-milling. As is well-known, the wind-milling operation of a rotor provides substantially no dragging action. As the adjustment of the blades about their longitudinal axes approaches the position shown in Figs. 4 and 5 of the drawings, the wind-milling operation gives way to autorotation, whereupon the blades continue to rotate about the axis of the hub and set up a powerful dragging action to thereby retard the forward movement of the craft.

With blades having usual autorotative properties, autorotation is secured upon movement of the blades into a position substantially 85° from that shown in Fig. 6 of the drawings, and autorotation will continue to an increasing extent while the blades are moved through a further angle of approximately 10°, that is, into a position approximately 5° beyond that shown in Figs. 4 and 5 of the drawings. With the structure herein disclosed, it will be apparent that the desired angular setting of the blades may be effected at any time while the craft is in flight.

While I have illustrated in the drawings a specific form of mechanism for effecting the required adjustment of the blades about their longitudinal axes, it will be understood that other suitable mechanism may be employed so long as it is capable of moving the rotor, or the parts thereof, into and out of autorotative position. As indicated above, however, any such control mechanism should be so constructed as to rotate the blades about their longitudinal axes through at least 95°, the maximum braking effect due to autorotation of the rotor being attained when the blades are set at an angle slightly more than 90° from that shown in Fig. 6 of the drawings. It will be understood that the optimum setting will vary for different airfoils.

While I have shown the retarding device attached to the tail structure of the airplane illustrated in Fig. 1 of the drawings, it will be understood that it may be otherwise positioned so long as it is arranged to retard the forward movement of the plane when in flight, and care is taken to disturb its stability as little as possible.

Figure 2:
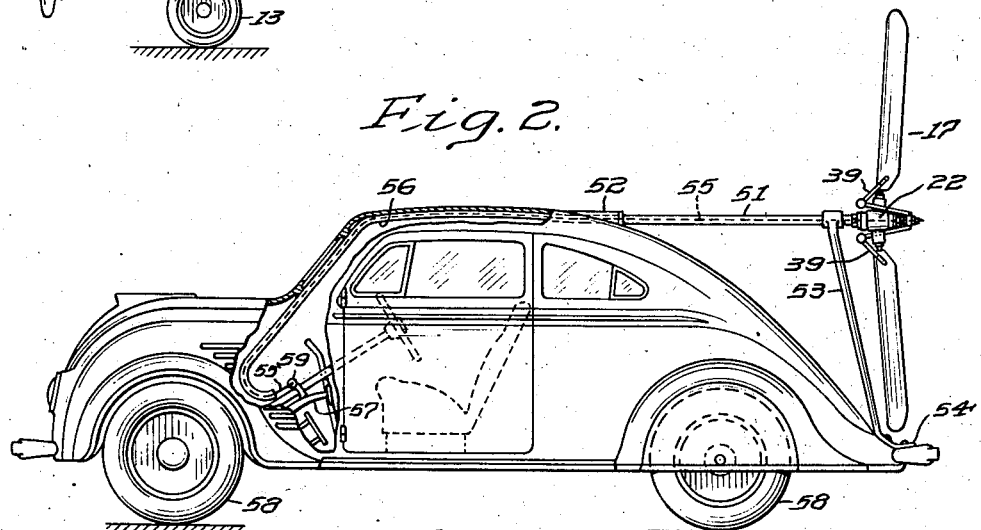
Fig. 2 is a side elevational view of an automobile having my invention incorporated therein, parts of the automobile being in section to show the mechanism by which the retarding device may be moved into and out of operating position.

In Fig. 2 of the drawings I have shown a retarding device 17 incorporated in an automobile of usual construction for the purpose of utilizing the dragging force of the device upon the air to effect a braking action upon the forward movements of the vehicle. The structure of the rotor device 17 is similar to that shown in Figs. 1, 4, 5 and 6 as heretofore described. In this case the inner end of the tubular supporting member 51 is rigidly attached to the upper part of the automobile body as shown at 52, and its outer end is supported by a frame 53 the legs of which have their lower ends secured at 54 to a rigid part of the automobile structure, such as the chassis.

In this adaptation of my invention the control rod 55 for adjusting the setting of the rotor blades 30 projects forwardly from the tubular member 51 into a guide tube 56 which may extend beneath the roof of the automobile and downwardly into a position adjacent the brake pedal 57 commonly used for actuating brakes which act upon the wheels 58. The forward end of the control rod 55 may be connected to a projection 59 on the brake pedal 57 in such a manner that downward movement of the brake pedal to actuate the wheel brakes will operate through the control rod to move the blades 30 of the retarding device from the position shown in Figs. 2 and 6 into the position shown in Figs. 4 and 5. Inasmuch as the braking effect of the rotor will be negligible at low speeds, such as 25 miles per hour and under, and the device has its principal utility upon open country roads where higher automobile speeds may be maintained, it may be desirable to provide suitable means for disconnecting the control rod from the brake pedal for driving in congested areas where speed limits are low. In case it is not desirable to connect the control rod to the brake pedal, a separate manual control, such as the lever 50 shown in Fig. 1, may be employed.

Figure 3:
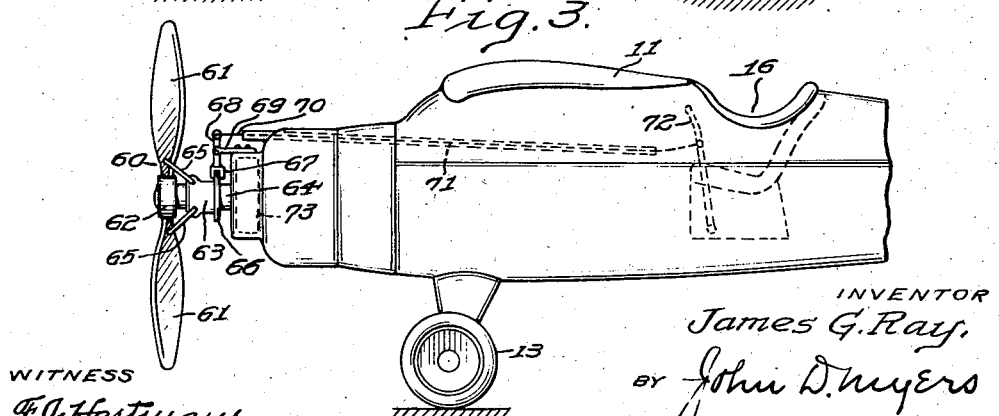
Fig. 3 is a partial side elevational view of an airplane provided with a modified form of my invention.

In Fig. 3 of the drawings I have shown a modified form of retarding device incorporated in an aircraft similar to that illustrated in Fig. 1. In this case the air screw 60 which is utilized for propelling the craft forwardly through the air is so constructed that the blades 61 may be easily and quickly adjusted from propelling position into autorotative position and vice versa. In such a modified form of retarding device the inner ends of the blades 61 are supported in such a manner in the hub 62 as to permit them to be rotatably adjusted about their longitudinal axes. Such an adjustment of the blades may be effected by means of a collar 63 slidable on the drive shaft 64 and non-rotatable thereon. This collar may be connected to the blades by link mechanism 65 similar to that shown in Figs. 4, 5, and 6.

One end of the collar 63 is provided with an outwardly extending flange 66 with which the forked end 67 of a lever 68 engages. The lever 68 is fulcrumed on a support 69 secured to a rigid part of the craft, and is actuated by a control rod 70 extending backwardly through a guide tube 71 and having its inner end connected to a control lever 72 in the cockpit 16. As will be apparent, movement of the control lever 72 operates through the control rod 70, the lever 68, the sliding collar 63 and the link mechanism 65 to move the propeller blades 61 into either the propelling position or the autorotating position. It is essential with such a structure that some means be provided whereby the propeller may be disconnected from the engine in order that the propeller may turn freely with respect to the engine when the blades are in a position to produce autorotation. This may be accomplished by providing a clutch mechanism 73 of the freewheeling type in the shaft 64, between the propeller and the engine.

In the case of airplanes, it is well known that the high speed with which they land necessitates a long roll after contact is made with the ground. As is also well known, the ground wheels of an airplane are usually not in firm and constant contact with the ground during the early part of the landing roll, and in consequence no effective braking action can be obtained through the ground wheels. It is also well known that if an undue braking load is imposed upon the ground wheels in landing, there is a tendency for the plane to nose over, particularly on account of its high center of gravity. The present invention overcomes these difficulties by reason of the fact that the airflow is utilized for taking the braking load, and the retarding device may readily be positioned on the plane in such a manner as to have no substantial adverse effect upon the plane's stability.

As is also well known, an airplane glides at a relatively flat angle in approaching a landing area, and the better types of modern planes have extremely flat gliding angles. This flat angle makes landing in a small area very difficult, especially where there are obstacles in the approach to the landing area. The present invention makes it possible for the pilot to apply an aerodynamic drag or braking action which will appreciably steepen the gliding path and make it possible to land much closer to an obstacle after passing over it.

The present invention also makes it possible for the pilot of an airplane to alter instantly and at will the amount of imposed drag, thus enabling him to choose, within certain limits, a proper gliding angle, and to land at the spot desired. Thus if it becomes apparent to the pilot that his plane, with some drag imposed by means of the retarding device, will land short of a chosen area, the autorotative device may be adjusted into a position which will impose less drag and thereby permit the plane to glide further. On the other hand, if the pilot finds that he is overshooting a desired landing spot, additional drag up to the maximum of the device may be imposed to correct the landing angle.

It is also desirable in various flight maneuvers to decelerate rapidly from a high speed without converting this speed into altitude. In air combat the attacking plane attains excessive speed in diving at an enemy. When firing range is reached, only a few shots can be fired from present planes before it becomes necessary to pull up to avoid a collision. The present invention makes it possible to decrease an excessive speed quickly and adjust the flight speed of the attacking plane to remain within firing range for a longer time.

The invention has a further advantage as applied to airplanes in that it may be utilized to provide a form of auxiliary control. When the autorotative device is mounted on the tail of the plane, controlling moments of considerable extent may be obtained. Such a structure may be employed for improving the flight characteristics of planes at slow speeds where conventional control devices are not particularly effective.

From the standpoint of high speeds, the safety of most land vehicles such as automobiles, trains and the like, depends upon their ability to decelerate their speeds rapidly. Only a limited retardation can be obtained by applying a braking force to the wheels with the consequent friction against the ground, rails or other roadway. When the wheels begin to slide the limit of braking action is reached. At the high speeds traveled by present-day vehicles, this method of braking is often inadequate. Future vehicles traveling at still higher speeds will require to a much greater extent some additional means for rapidly dissipating their tremendous inertia forces.

The present invention provides means for transmitting energy to the relative air flow in a manner such as to materially augment the usual frictionally actuated braking system.

A vehicular braking system which operates through contact of the wheels with the surface of the roadway often becomes inoperative due to some natural condition interfering with or decreasing the normal friction coefficient between the wheels and the roadway. It is well known that ice formations on the roadway, and oiled or wet road surfaces interfere with such systems of braking. It is also well known that when such a system is used too near its maximum the control and stability of the vehicle may be seriously interfered with. The method of braking provided by the present invention is free from these faults for the reason that the dissipation of energy to the relative air flow is independent of all surface conditions, and does not interfere materially with the control or stability of the vehicle.

While certain forms of my improvement, together with certain preferred arrangements of the various parts thereof, have been disclosed herein, it is to be understood that the invention is not intended to be limited to the precise structure and arrangement of parts shown and described. The above description and the accompanying drawings are therefore to be regarded as illustrative only, and it is to be understood that the invention is susceptible of embodiment in other forms and arrangements, so long as they come within the scope of the appended claims.

What I desire to claim is:

1. The combination with an aircraft having powered means on the front end thereof for forward propulsion, of an aerodynamic retarder comprising an air-driven autorotative rotor secured to the tail of said aircraft for rotation upon an axis extending substantially through the center of gravity of said aircraft and provided with a plurality of blades having an airfoil section, and means whereby said blades may be adjusted into and out of autorotative positions when said aircraft is in motion.

2. The combination with an aircraft having powered means for forward propulsion, of an aerodynamic retarder comprising a spindle mounted on the tail of said aircraft with its axis passing substantially through the center of gravity of said aircraft, a hub rotatively supported on said spindle, a plurality of blades of airfoil section having the inner end of each rotatably mounted in said hub, and means for rotating said blades into and out of autorotative position.

3. In an aircraft having powered means for forward propulsion and a control compartment, an aerodynamic retarder mounted on the tail of said aircraft for rotation upon an axis extending substantially through the center of gravity of said aircraft and comprising an air-driven autorotative rotor having a plurality of airfoil blades mounted for angular movement into and out of autorotative position, manually operated means in said control compartment for moving said blades into and out of autorotative position, and actuating means connecting said manually operated means with said blades.

JAMES G. RAY.